United States Patent [19]

Clasen

[11] Patent Number: 4,726,828

[45] Date of Patent: Feb. 23, 1988

[54] METHOD OF MANUFACTURING ROTATIONALLY SYMMETRICAL GLASS BODIES

[75] Inventor: Rolf Clasen, Aachen, Fed. Rep. of Germany

[73] Assignee: U. S. Philips Corporation, New York, N.Y.

[21] Appl. No.: 885,344

[22] Filed: Jul. 14, 1986

[30] Foreign Application Priority Data

Oct. 25, 1985 [DE] Fed. Rep. of Germany ....... 3537972

[51] Int. Cl.⁴ ..................... C03B 37/016; C03C 15/00
[52] U.S. Cl. ..................................... 65/18.1; 65/3.11; 65/17; 501/12
[58] Field of Search ..................... 65/2, 3.11, 3.12, 17, 65/18.1, 18.3, 18.4; 156/DIG. 108; 501/12

[56] References Cited

U.S. PATENT DOCUMENTS

| 4,417,910 | 11/1983 | Passaret | 65/3.12 |
| 4,541,855 | 9/1985 | Scherer | 65/18.1 |
| 4,605,428 | 8/1986 | Johnson et al. | 65/2 |

FOREIGN PATENT DOCUMENTS

| 123191 | 4/1984 | European Pat. Off. . | |
| 59-131538 | 7/1984 | Japan | 65/18.1 |
| 59-152235 | 8/1984 | Japan | 65/2 |
| 60-054928 | 3/1985 | Japan | 65/17 |
| 682580 | 11/1952 | United Kingdom . | |

Primary Examiner—Robert L. Lindsay
Attorney, Agent, or Firm—Thomas A. Briody; William J. Streeter; Ernestine C. Bartlett

[57] ABSTRACT

A method of manufacturing rotationally symmetrical glass bodies. The starting material for the glass body is a thixotropic suspension consisting of powered glass in a liquid dispersing agent. The suspension is introduced into a hollow mold whose geometry corresponds to that of the glass body to be formed. The hollow mold is rotated about its longitudinal axis to deposit the suspension on the inner wall of the hollow mold. The after which the green body thus formed is purified and sintered. The green body is formed by heating the rotating mold and the suspension therein to a temperature below the boiling point of the dispersing liquid until cross-linking and solidification of the starting material is obtained. Thereafter, the green body can be removed from the hollow mold.

27 Claims, 1 Drawing Figure

METHOD OF MANUFACTURING ROTATIONALLY SYMMETRICAL GLASS BODIES

BACKGROUND OF THE INVENTION

The invention relates to a method of manufacturing rotationally symmetrical glass bodies. In the method, the starting material for the glass body is a thixotropic suspension consisting of powdered glass in a liquid dispersing agent. The suspension is introduced into a hollow mold whose geometry corresponds to that of the glass body to be formed. The hollow mold is rotated about its longitudinal axis to deposit the suspension on the inner wall of the hollow mold. The green body thus formed is then purified and sintered.

The invention further relates to an apparatus for performing such a method, and to the use of the glass bodies manufactured by the method according to the invention.

The method described above is particularly suitable for the manufacture of performs for optical waveguides made of quartz glass.

Optical waveguides have a wide range of application. They are used, for example, in short-distance light-transmission arrangements or long-distance light-transmission arrangements as used in optical communication systems. They predominantly consist of a type of glass which has a high silicon dioxide content (which, if necessary, contains a dopant to adjust the refractive index of the glass).

Types of glass which can suitably be used for optical waveguides, can also advantageously be used for the manufacture of lamp envelopes for halogen lamps or gas-discharge lamps. This is because these types of glass must, like the types used for optical waveguides, be substantially anhydrous and contain a high silicon dioxide content.

The British patent GB No. 682580 describes a method of manufacturing porous glass tubes, for example for use as filters in laboratories, by a centrifuging process. In this method, it is important to obtain a highly uniform distribution and size of the pores in the sintered body containing glass particles and to ensure that the pores are in communication with one another. For this purpose, the suspension consists of powered glass having a highly uniform grain size. The glass powder is mixed, during constant stirring, with a binder, for example an aqueous glycerine solution, which presents settling of the solid particles. The powder is also mixed with wetting agents and agents which inhibit foaming of the suspension, in order to obtain a distribution of the solid particles in the suspension in conformity with the desired porosity.

Such a method is unsuitable when the solid particles to be deposited on the inner wall of a centrifuge must be as densely spaced as possible, and when the suspensions contain solid particles of very different particle sizes.

SUMMARY OF THE INVENTION

It is an object of the invention to provide a method, and an apparatus for performing this method, of manufacturing geometrically precise and mechanically stable green bodies by a centrifuging process of relatively brief duration. In the method, the starting material for the manufacture of the glass bodies is preferably an aqueous suspension having a solids content of microdispersed $SiO_2$ particles. The green bodies have such a density that they can form nonporous quartz-glass bodies of a sufficiently high quality for the manufacture of preforms for optical waveguides.

This object is achieved according to the invention by heating the starting material together with the hollow mold at a temperature below the boiling point of the dispersing liquid until it has cross-linked and solidified and can be removed from the hollow mold.

An apparatus for performing this method comprises a hollow mold which can be rotated about its longitudinal axis like a centrifuge and in which starting material for the glass body is introduced in the form of a suspension for forming a green body. The mold comprises two stoppers arranged perpendicular to the longitudinal axis. The apparatus further comprises a device for heating the hollow mold and the starting material contained therein by high-frequency energy or microwave energy.

The invention is based on the recognition that suspensions of microdispersed $SiO_2$ particles having diameters in the range from 100 to 500 nm exhibit a very high thixotripic effect. This effect is enhanced by the addition of an ionogenic substance which facilitates cross-linking of the solid particles in the suspension, which moves the pH-value of the suspension toward acidity ($pH \leq 3$) or alkalinity ($pH = 5$ to 8). The thixotropic effect can be used to liquefy the starting material, by first applying mechanical forces, preferably sound or ultrasonic waves, to minimize the viscosity of the starting material, and in which the starting material can be efficiently homogenized and compacted. A suspension which is prepared as described above can be deposited on the inner wall of a hollow mold by centrifuging in a relatively short time. Cross-linking reactions between the solid particles of the suspension, which lead to a solidification of the deposited green body, can be accelerated by heating the deposited green body to temperatures below the boiling point of the dispersing agent.

According to advantageous modified embodiments of the invention, the suspensions used as the starting material for the glass bodies containing $SiO_2$ particles either with or without a suitable doping for obtaining a desired refractive index. The $SiO_2$ particles have diameters in the range from 10 to 500 nm, preferably from 10 to 100 nm, and have an average particle diameter of 40 nm.

$GeO_2$ is, for example, a suitable dopant. By adding an ionogenic additive in an amount from 0.1 to 5% by weight, preferably from 0.75 to 1% by weight of the solids content (which additive moves the pH-value of the suspension toward acidity ($pH \leq 3$) or toward alkalinity ($pH \geq 5$ and $\leq 8$)), a very high thixotropic effect is produced despite the high content of microdispersed solid particles in the suspension, very homogeneous green bodies having a high density can be produced from this starting material by a centrifuging process.

According to further advantageous embodiments of the method, an ammonium compound, particularly $NH_4F$ in an aqueous solution, is used as an ionogenic additive. Ammonium compounds are very volatile. Consequently, they can be fully removed from the green body in a subsequent purification-heating step, so that quartz-glass bodies of very high purity can be manufactured. Due to the addition of an ammonium compound, for example $NH_3$ in an aqueous solution, green bodies having a relatively great strength are obtained because gel-formation takes place at the locations of the contact areas of two $SiO_2$-primary particles. For example, at a suspension temperature of 20° C. and a pH-value of ≦10, $SiO_2$ dissolves at a rate of approximately 100 ppm and is deposited at the contact areas, such that a bridging layer is formed. When $NH_4F$ in an aqueous solution is used as an ionogenic additive, a fluorine doping can be obtained which is suitable, for example, for the manufacture of cladding glasses for optical waveguides.

In yet another advantageous embodiment of the method according to the invention, the viscosity of the starting material is minimized by subjecting the the influence of sound waves having a frequency f in the range from 20 to 200 Hz or ultrasonic waves having a frequency f in the range from 20 to 50 kHz.

In thixotropic systems, any type of mechanical disturbance, for example stirring or shaking, brings about a gel-to-sol conversion. However, if a more viscous starting material is liquefied by a sonic or ultrasonic vibrator whose amplitude is such that the sonic or ultrasonic field is applied to the starting material to be liquefied, a very fast liquefaction of the starting material is obtained. Hence cavities in the starting material are effectively dissolved, as gas bubbles rise to the surface of the liquefied starting material and are automatically eliminated. Such a degassing process can even be accelerated by, for example, liquefying the starting material in a vacuum. This step in the present modified embodiment of the invention holds a great advantage for the homogeneous production of a suspension having a solids content of microdispersed $SiO_2$-particles for a centrifuging process.

In a further advantageous embodiement of the method according to the invention, the starting material deposited in the rotation hollow mold is heated to a temperature below the boiling point of the dispersing liquid by applying microwave energy having a frequency f of ≈2.45 GHz, or by applying high-frequency energy having a frequency f of ≈27 MHz. This step of the method is based on th recognition that cross-linking reactions between primary particles as they occur in thixotropic systems, can be substantially accelerated by raised temperatures below the boiling point of the dispersing liquid. For this purpose, aqueous suspensions can advantageously be heated directly be applying microwave energy.

In further advantgeous embodiments of the method according to the invention, an auxiliary layer of a liquid whose density is higher than that of the suspension is deposited on the inner surface of the hollow mold by centrifuging prior to the deposition of the green body. Suitable liquids for forming the auxiliary layer are, in particular, bromonaphthalene of diiodomethane.

The deposit of an auxiliary has the advantage of eliminating any surface roughnesses of the hollow mold. Also, the deposited green body can more readily be removed from the mold. At the same time, possible eccentricity of the hollow mold operating as a centrifuge is eliminated.

In still further advantageous embodiments of the method according to the invention, a separation layer is provided between the auxiliary layer and the green body. The separation layer is made of a synthetic resin which does not react with the dispersing liquid. The material used for this separation may be, for example, polycarbonates, polyethyleneterphthalate or elastomeric synthetic resins, such as for example, polyurethane.

The separation layer can be in the form of a tube. This has the advantage that, for example, the suspension can already be homogenized in the tube and can be converted to a state of lower viscosity under the influence of sound waves or ultrasonic waves. The tube containing the low-viscosity suspension can then be introduced into the hollow mold operating as a centrifuge.

To remove the green body deposited by centrifuging, after cross-linkage and solidification, the tube may be cut open and withdrawn or may be separated chemically.

Using a tube of an elastomeric synthetic resin has the advantage that is is not necessary to apply an additional auxiliary layer to the inner wall of the hollow mold. When nonelastic synthetic resin tubes are used, the auxiliary layer serves as a separation layer to provide an optimal centering. When an elastic material is used for the separation layer, for example, a tube of such a synthetic resin uniformly contacts the inner wall of the hollow mold without having to use an auxiliary layer due to the elastic properties of the tube. Therefore, the tube is properly centred in the hollow mold even without being supported by an auxiliary layer.

When a tubular separation layer of an elastomeric material is used without the corresponding auxiliary layer, a divided mold must be used to allow for the removal of the green body.

In a further advantageous embodiment of the method according to the invention, the suspension is introduced into the hollow mold after the suspension is cooled to a temperature of, preferably, ≈4° C. This has the advantage that initially cross-linking between the solid particles of the suspension proceeds slowly.

The advantages which can be obtained by the present invention are that thixotropic suspensions having a solids content of microdispersed $SiO_2$-particles can be efficiently deformed in a centrifuging process. In centrifuging processes, generally, care should be taken that the solid particles to be deposited are of a highly uniform particle size, because this is the only way to avoid the formation of shrinkage cracks during drying of the deposited green bodies consisting of submicroscopical solid particles. As commercially available powdered starting materials for use in, for example, the manufacture of optical waveguides generally exhibit a wide grain distribution (for example particle diameters from 5 to 500 nm) it was necessary prior to the present invention, in particular when using these microdispersed, commercially available $SiO_2$-powders for centrifuging processes, to first carry out a time-consuming classification process.

Surprisingly, it was found that a classification of the commercially available $SiO_2$-powders is not necessary in the method of the present invention. In the present invention it is possible to obtain microdispersed, homogeneous green bodies through a centrifuging process in which, preferably, an acqueous suspension is used whose solids content consists of microdispersed commerically available $SiO_2$-powders. This is possible when, preferably, prior to the introduction of the suspension into the centrifuge, the suspension is homogenized and converted to a state of low viscosity by sound waves or ultrasonic waves, and cross-linking of the deposited solid particles is facilitated by heating to a temperature below the boiling point of the dispersing liquid.

A further advantage of the method according to the invention is that a relatively low centrifuge speed, of the order of an 2000 to 4000 R.P.M., is sufficient for depositing the green body.

A further advantage of the present method is that the green bodies obtained by centrifuging have a high density due to using suspensions which have a high, microdispersed solids conetent. It should be emphasized that the centrifuging process does not lead to a phase separation of the suspensions used. The quartz-glass bodies subsequently obtained by sintering the green bodies exhibit a very high degree of dimensional stability and are free of pores and reams.

A further advantage is that very homogeneous suspensions can be readily mixed and produced due to the very low viscosity of the suspensions. It is easy for air bubbles present in the suspension to escape.

Yet another advantage is that rotationally symmetrical green bodies having any cross section can be obtained. On the one hand, the green bodies are so stable that they can readily be handled and have the desired density (35 to 50% of the density of compact quartz glass) for the subsequent sintering operation. On the other, the green bodies are so porous and hence gas permeable that after drying they can be efficiently purified in a heated gas phase which reacts with the impurities present.

A further advantage is that exceptionally homogeneous green bodies can be obtained. This is important not only in view of attaining glass bodies which are free of bubbles and reams but also for drying the deposited green bodies. Dry cracks frequently appear at the location of inhomogeneities in the green body. They also occur in the event of unsatisfactory cross-linking between the solid particles (i.e. when the surfaces of the solid particles are not uniformly coated with additives which facilitate cross-linking). This is a problem in systems with large surfaces. By means of a very good homogenization of the starting material, the method of the present invention provides an important improvement.

A further advantage is that the deposited green bodies can readily be removed from the mold, even when green bodies are manufactured in the form of long tubes. This is obtained by applying the auxiliary layer to the inner wall of the hollow mold, and by the use of a separation layer.

DESCRIPTION OF THE PREFERRED EMBODIMENTS

Figure 1:
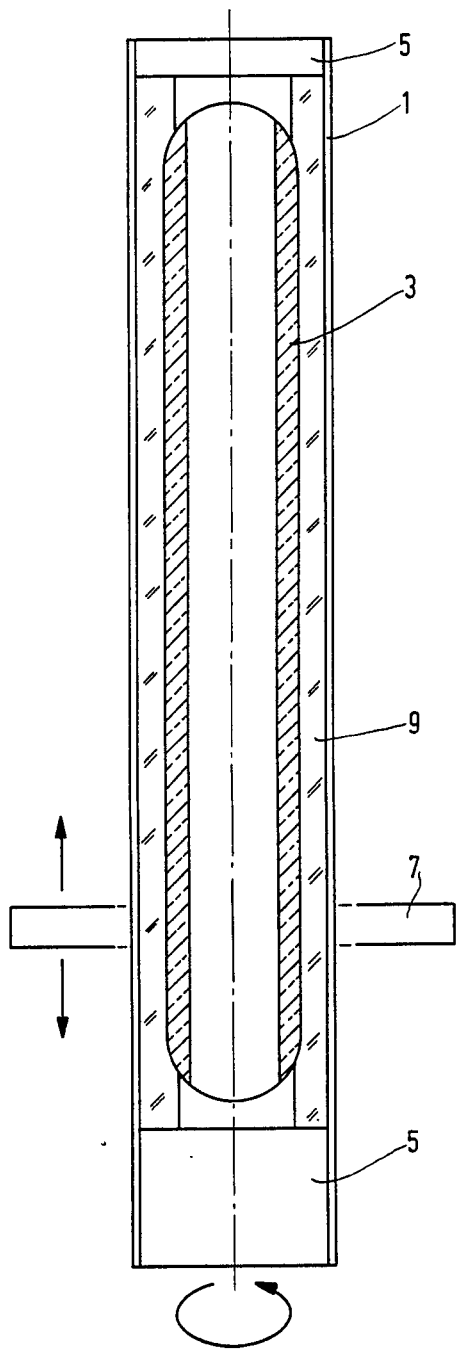
FIG. 1 is a cross-sectional view of an apparatus for manufacturing rotationally symmetric glass bodies.

FIG. 1 is a sectional view of a hollow mold 1 which can be driven like a centrifuge. Mold 1 is provided at its inner wall with an auxiliary layer 9. Layer 9 is deposited by centrifuging and consists of a liquid having a higher density than that of the suspension. The auxiliary layer 9 may consist of, for example, bromonaphthalene or diiodomethane.

A green body 3 is deposited by centrifuging on the auxiliary layer 9. The body 3 consists of a suspension containing solid microdispersed $SiO_2$-particles having diameters in the range from 10 to 500 nm, preferably 10 to 100 nm, and an average diameter of 40 nm. Water is the dispersing agent. An ionogenic additive moves the pH of the suspension toward alkalinity (for example $NH_4F$ in an aqueous solution).

The hollow mold 1 is closed at its ends by two stoppers 5. Along the axis of the hollow mold 1 a device 7 can be moved. Device 7 heats mold 1 and its contents by high-frequency or microwave energy. Heating of the deposited green body 3 may also be carried out in a furnace. However, this will result in a slightly extended duration of the cross-linking process.

The hollow mold 1 can be horizontally and vertically rotated about its longitudinal axis by means of a motor having a rotational speed ranging from 2000 to 4000 R.P.M. The motor is not shown in the drawing. To carry out the centrifuging process the hollow mold 1 may, for example, be clamped in a commercially available lathe.

Examples of the method according to the invention will now be described.

EXAMPLE I

A suspension is produced from 100 g of quartz-glass powder having an average particle size of 40 nm and a particle-size distribution in the range from 10 to 100 nm, to which is added 95 ml of bidistilled water and 15 ml of an aqueous 5% ammonium fluoride solution. The suspension is homogenized in an ultrasonic bath at a frequency f from $\approx 20$ to 50 kHz for 15 minutes.

The suspension, which is cooled to a temperature of preferably $\approx 4°$ C. is introduced into a glass tube together with 40 ml of bromonaphthalene. The tube serves as a hollow mold 1 and has a diameter of 25 mm and a length of 600 mm. The tube is closed at its ends by means of stoppers 5 which are so formed that they can be clamped in a commercially available lathe.

Cooling the suspension has the advantage that the subsequent cross-linking process between the solid particles of the suspension starts only slowly. Subsequently, the filled tube is rotated at a speed of 3400 R.P.M., for 4 minutes. In this process, first the bromonaphthalene forms a thin liquid film 9 on the inner surface of the tube due to the fact that it has a higher density than the aqueous suspension. Next, the suspension is deposited in the form of a uniformly thick, concentric layer which forms the green body 3. In this process, a separation of the liquid phase and the solid phase does not occur.

At a reduced rotational speed of 2500 R.P.M., cross-linking of the solid particles within the deposited green body is induced by microwave heating using a microwave resonator 7. Resonator 7 has a power output of 100 W at a frequency of 2.45 GHz. The microwave resonator is moved forward and backward various times over the entire length of the hollow mold at a speed of 6 cm/min.

After opening the stoppers, the cross-linked, solidified green body can readily be removed and is dried on a soft support for eight days. Subsequently, the tubular green body 3 obtained is purified in an oxygen atmosphere to which 10% by volume of chlorine gas is added. The green body is so purified for two hours at a temperature of 800° C. Finally, the green body is sintered in a helium atmosphere to which 2% by volume of chlorine gas is added at a temperature of 1500° C. The green body passes through the sintering furnace at a rate of 10 mm/min.

A transparent quartz-glass tube free of bubbles and reams was obtained having a density of 2.20 $g/cm^3$ and a refractive index $n_D$ of 1.4590. The outside diameter of the quartz-glass tube obtained is 18 mm and the inside diameter is 13 mm.

The residual contamination by water and transition metals amounts to less than 10 ppb.

EXAMPLE II

In the same way as described with respect to Example I, a suspension of 100 g of quartz-glass powder, 80 ml of water and 20 ml of a 5% NH$_4$F solution is produced and homogenized. The suspension is introduced into a sleeve of a polyethylene terephthalate foil having a diameter of 24 mm. The sleeve is sealed at a gauge pressure of 0.1 bar. In the subsequent centrifuging process the sleeve forms a separation layer between the auxiliary layer 9 and the centrifuged green body 3.

After sealing, the sleeve is introduced into a hollow mold made of a glass tube having a diameter of 25 mm. 40 ml of diiodomethane was previously introduced into the hollow mold to form the auxiliary layer 9. The purpose of the auxiliary layer, which consists of a liquid whose density is higher than that of the suspension, is basically to compensate for any surface roughnesses of the inner surface of the hollow mold. The auxiliary layer also facilitates the removal from the mold of the green body. If such a sleeve is used, the auxiliary layer serves the additional purpose of better centering the sleeve in the mold.

The solid particles of the green body deposited from the suspension can be cross-linked by microwave heating, as described in Example I (i.e. by making five times forward and backward passes a microwave resonator which has a power output of 150 W). The resonator was moved forward and backward over the mold at a rate of 10 cm/min.

In order to remove the centrifuged green body 3 from the mold the sleeve must be removed. The sleeve can be removed by dissolving it in hot phenol. The green body obtained is then purified and sintered as described in Example I.

The quartz-glass tube thus produced exhibits a very smooth outside surface and a perfectly smooth inside surface. The roughness of the surfaces is less than 1 μm. The excentricity and fluctuations in wall thickness are less than 1%.

After sintering, a quartz-glass tube was obtained which was free of bubbles and reams and contained ≦10 ppb of impurities, in particular water and transition metals. The glass body had a density of 2.20 g/cm$^3$ and a refractive index n$_D$ of 1.4590.

EXAMPLE III

The same suspension as described in Example II is introduced in the same way into a foil sleeve which is then sealed. The sleeve may consist of, for example, an elastomeric synthetic resin such as polyurethane. Instead of using a glass tube as a hollow mold, a two-part glass mold is used, which has a diameter of 24 mm. The other parameters of the method correspond to those described in Examples I and II. By the further process steps described in Examples I and II, a quartz-glass tube of the same quality as that described in Example II was obtained.

It is possible to successively deposit and solidify several layers which consist of suspensions having solids contents of a different chemical compositions. Thus, for the manufacture of different suspensions it is possible to use, for example, nondoped and differently doped SiO$_2$ powders. Quartz-glass bodies having step refractive index profiles can be manufactured from green bodies deposited in layers.

EXAMPLE IV

In the same way as described in Example I, a suspension which consists of 100 g of quartz-glass powder, 15 ml of an aqueous 5% NH$_4$F solution, and 80 ml of bidistilled water is produced in 30 minutes by stirring in an ultrasonic bath. The suspension is cooled to a temperature of approximately 4° C.

The cold suspension is poured into a polyurethane sleeve having a diameter of 26 mm and a wall thickness of about 50 μm. The sleeve is arranged in a two-part, divisible hollow mold. The mold consists of, for example, a metal such as aluminum. The sleeve has a useful length of 350 mm and an inside diameter of 30 mm, and it is expanded by a slightly raised pressure so that it lies against the inner wall of the hollow mold. Subsequently, the sleeve is sealed. Shaping it to the mold is performed by centrifuging for 5 min at 3500 R.P.M.

Cross-linking to form a rigid tube is performed by externally heating the hollow mold using a fan heater having an output of 2000 watts. In this process, the temperature of the air is 90° C. The heating time is about 10 minutes.

After the sleeve has cooled to room temperature it is dissolved using dimethylformamide. The still wet green body is slowly dried in a horizontal position.

The after treatment is carried out as described in Example I. A transparent quartz-glass tube was obtained having a length of 25 cm, a diameter of 22 mm (outside) and 14 mm (inside), a density of 2.20 g/cm$^3$, and a refractive index n$_D$ of 1.4590. The residual impurities consisting of water and transition metals amounted to less than 10 ppb.

What is claimed is:

1. A method of manufacturing rotationally symmetric glass bodies, said method comprising the steps of:
   providing a hollow mold having a longitudinal axis and having an inside with an inner wall;
   preparing a first liquid having a density;
   preparing a thixotropic suspension comprising a powdered glass material and a liquid dispersing agent, said liquid dispersing agent having a boiling point, said suspension having a density lower than the density of the first liquid;
   introducing the first liquid into the inside of the mold;
   introducing the suspension into the inside of the mold;
   rotating the mold about its longitudinal axis to deposit the first liquid on the inner wall of the mold to produce an auxiliary layer, and to deposit the suspension on the auxiliary layer;
   heating the suspension to a temperature below the boiling point of the liquid dispersing agent until the suspension cross-links and solidifies;
   removing the solidified suspension from the mold; and
   purifying and sintering the solidified suspension.

2. A method as claimed in claim 1, wherein the first liquid is bromonaphthalene.

3. A method as claimed in claim 1, wherein the first liquid is diiodomethane.

4. A method as claimed in claim 1, further comprising the step of providing a separation layer between the auxiliary layer and the suspension, said separation layer comprising a synthetic resin which does not react with the liquid dispersing agent.

5. A method as claimed in claim 4, wherein the synthetic resin is a polycarbonate.

6. A method as claimed in claim 4, wherein the synthetic resin is a polyethelene terephthalate.

7. A method as claimed in claim 4, wherein the synthetic resin is an elastomeric synthetic resin.

8. A method as claimed in claim 7, wherein the elastomeric synthetic resin is polyurethane.

9. A method as claimed in claim 8, wherein the separation layer is a sleeve.

10. A method of manufacturing rotationally symmetric glass bodies, said method comprising the steps of:
providing a hollow mold having a longitudinal axis and having an inside with an inner wall;
preparing a thixotropic suspension comprising a powdered glass material and a liquid dispersing agent, said liquid dispersing agent having a boiling point;
introducing the suspension into the inside of the mold;
rotating the mold about its longitudinal axis to deposit the suspension on the inner wall of the mold;
heating the suspension to a temperature below the boiling point of the liquid dispersing agent while rotating the mold until the suspension cross-links and solidifies;
removing the solidified suspension from the mold; and
purifying and sintering the solidified suspension.

11. A method as claimed in claim 10, wherein prior to the step of rotating the mold, the method further comprises the step of liquefying the suspension.

12. A method as claimed in claim 11, wherein the powdered glass material consists essentially of $SiO_2$ particles having diameters from 10 to 500 nanometers, with an average diameter of approximately 40 nanometers.

13. A method as claimed in claim 12, wherein:
some of the $SiO_2$ particles are doped to change their refractive index; and
the $SiO_2$ particles have diameters from 10 to 100 nanometers.

14. A method as claimed in claim 13, wherein the ratio by weight of the powdered glass material to the liquid dispersing agent is from 0.7:1 to 2:1.

15. A method as claimed in claim 14, wherein the liquid dispersing agent is water.

16. A method as claimed in claim 15, wherein the suspension further comprises an ionogenic additive for shifting the pH of the suspension into the range from 5 to 8 so as to increase the alkalinity of the suspension.

17. A method as claimed in claim 16, wherein the ionogenic additive is an ammonium compound.

18. A method as claimed in claim 16, wherein the ionogenic additive is an aqueous 5% $NH_4F$ solution.

19. A method as claimed in claim 18, wherein the ionogenic additive is added in an amount from 0.1 to 5% by weight relative to the powdered glass material.

20. A method as claimed in claim 19, wherein:
the ionogenic additive is added in an amount from 0.75 to 1% by weight relative to the powdered glass material; and
the ratio by weight of the powdered glass material to the liquid dispersing agent is from 0.9:1 to 1:1.

21. A method as claimed in claim 20 further comprising the step of vibrating the suspension at a frequency from 20 to 200 hertz or from 20 to 50 kilohertz prior to rotating the mold.

22. A method as claimed in claim 21, wherein the step of heating the suspension comprises heating the suspension by microwave radiation having a frequency of approximately 2.45 gigahertz.

23. A method as claimed in claim 21, wherein the step of heating the suspension comprises heating the suspension by electromagnetic radiation having a frequency of approximately 27 megahertz.

24. A method as claimed in claim 23, wherein the $SiO_2$ particles are doped with $GeO_2$.

25. A method as claimed in claim 24, wherein after the suspension is solidified, but before the suspension is removed from the mold, the method further comprises the steps of:
preparing a second thixotropic suspension comprising a powdered glass material and a liquid dispersing agent, said liquid dispersing agent having a boiling point;
introducing the second suspension into the inside of the mold;
rotating the mold about its longitudinal axis to deposit the second suspension on the solidified first suspension; and
heating the second suspension to a temperature below the boiling point of the liquid dispersing agent while rotating the mold until the second suspension cross-links and solidifies.

26. A method as claimed in claim 25, further comprising the step of cooling the suspension to approximately 4° C. prior to introducing the suspension into the mold.

27. A method of manufacturing rotationally symmetric glass bodies, said method comprising the steps of:
providing a hollow mold having a longitudinal axis and having an inside with an inner wall;
preparing a thixotropic suspension comprising a powdered glass material and a liquid dispersing agent, said liquid dispersing agent having a boiling point;
cooling the suspension to a temperature at which cross-linking between powdered glass particles in the suspension proceeds slowly;
liquefying the suspension;
introducing the suspension into the inside of the mold;
rotating the mold about its longitudinal axis to deposit the suspension on the inner wall of the mold; and then
heating the suspension to a temperature below the boiling point of the liquid dispersing agent while rotating the mold until the suspension cross-links and solidifies;
removing the solidified suspension from the mold; and
purifying and sintering the solidified suspension.

* * * * *